May 26, 1925.

A. K. THORNBURG

SILENT GEAR STRUCTURE

Filed Nov. 13, 1923

Inventor
Argyle K. Thornburg
By Bair & Freeman Attys

Witness
Lynn Latta

Patented May 26, 1925.

1,539,149

UNITED STATES PATENT OFFICE.

ARGYLE K. THORNBURG, OF PLEASANTVILLE, IOWA.

SILENT-GEAR STRUCTURE.

Application filed November 13, 1923. Serial No. 674,555.

*To all whom it may concern:*

Be it known that I, ARGYLE K. THORNBURG, a citizen of the United States, and a resident of Pleasantville, in the county of Marion and State of Iowa, have invented a certain new and useful Silent-Gear Structure, of which the following is a specification.

The object of my invention is to provide a silent gear structure of simple, durable and inexpensive construction.

More particularly, it is my object to provide a device for preventing noise caused by the operation of meshing gears, in which there is mounted on one of the gears an auxiliary gear member having a limited spring pressed rotary movement with relation to the gear upon which it is mounted for causing its teeth to "follow" under yielding tension the teeth of the meshing gear.

With these and other objects in view, my invention consists in the construction, arrangement and combination of the various parts of my device, whereby the objects contemplated are attained, as hereinafter more fully set forth, pointed out in my claim, and illustrated in the accompanying drawings, in which:

Figure 1:
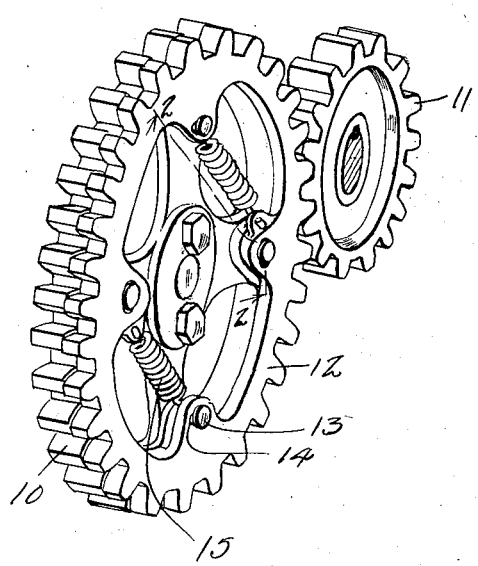
Figure 1 shows a perspective view of a silent gear structure embodying my invention.
Figure 2:
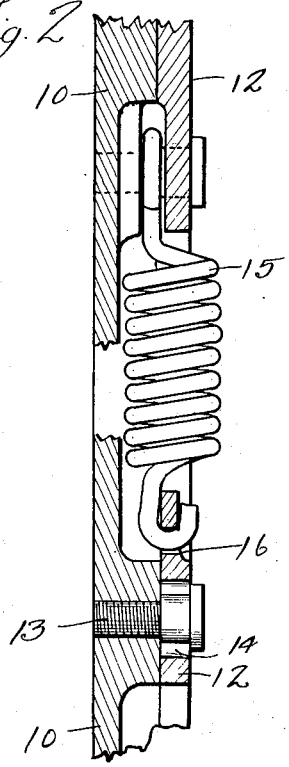
Figure 2 shows a detail, sectional view somewhat enlarged taken on the line 2—2 of Figure 1.
Figure 3:
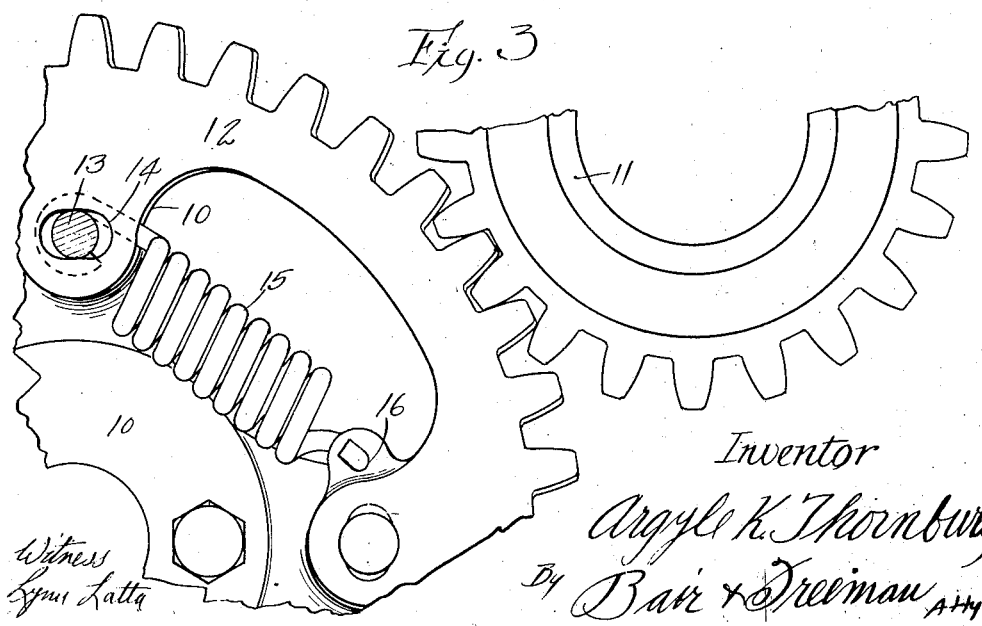
Figure 3 shows an enlarged side elevation of a part of the device.

It is well-known that in some cases where intermeshing gears are used, as for instance in connection with the timing gears of the well-known Ford automobile, there is sometimes a clicking noise, which is disagreeable and which becomes more noticeable as the gears become more worn.

I have shown my device illustrated in connection with a pair of timing gears, to show the manner in which the noise ordinarily incident to use of such gears may be largely done away with.

In the accompanying drawings, I have used the reference numeral 10 to indicate generally a gear of the type such as is used for a cam shaft gear arranged in mesh with a gear 11, such as is used on the crank shaft of the Ford automobile.

It will be noted that the gear 11 has a wider face than the gear 10.

Supported on the gear 10 is a gear 12 of narrower face, having a limited sliding movement on the gear 10 and spring pressed to its limit of movement in one direction.

Projecting from the side of the gear 10 are pins 13, which extend through slots 14 elongated on the arcs of a circle, having its center at the center of the gears 10 and 12.

It will thus be seen that the gear 12 has limited rotary movement on the pins 13 with relation to the gear 10.

Connected with the gear 10 as for instance with the pins 13 are coil springs 15, each of which is also connected with the gear 12, as at 16, so as to yieldingly tend to cause the teeth of the gear 12 to travel a little ahead of the teeth of the gear 10.

It may be understood that when the gear 11 is out of mesh, the teeth of the gear 12 will stand ahead of the teeth of the gear 10.

When the gears are new and the gear 11 is placed in mesh with the gear 10 and the gear 12, its teeth will engage the teeth of the gear 12 and rotate that gear (when the forms used in the drawing are employed) slightly clockwise, so that after the gears are thus meshed, the springs 15 will cause the teeth of the gear 12 to follow and snugly press against the teeth of the gear 11.

I have had such a timing gear in practical use and I find that it practically eliminates the noise from the gears, due to the fact that there is ordinarily slight play between the teeth of the meshing gears.

In the Ford timer gears for instance, there are times when the cam shaft gear tends to rotate faster for a short distance than the crank shaft gear, due to the action of the springs and engine valves on the engine valve stems. It is obvious that this tends to cause an increased rattling or clicking in the gears, and I find that this rattling or clicking under such circumstances wholly done away with where my silent gear is used.

The structure shown may be used with spirally cut gears and where that type of gear is employed it will be seen that the meshing of the spiral gears will eliminate end play of the shaft (for instance the cam shaft) on which the gears 10 and 12 are mounted.

It will be obvious that a silent gear structure of the kind under consideration may be used in a great variety of places other than in connection with timing mechanism, and it will, of course, be obvious that modification may be adopted for the arrangement of the parts and arrangement of the mounting of the springs, and it is my intention and purpose to cover by my claim any modified forms of structure or use of mechanical equivalents, which may be reasonably included within its scope.

I claim as my invention:

In a silent gear structure, a gear, a hubless gear at the side thereof having inwardly projecting lugs as shown provided with elongated slots, headed bolts projected through said slots and secured to said first gear, and springs each connected with a bolt and with a spaced lug of the second gear.

Des Moines, Iowa, October 1, 1923.

ARGYLE K. THORNBURG.